H. S. KERR.

Sponge-Brush.

No. 6,692. Reissued Oct. 11, 1875.

Witnesses:

Lewis F. Brous,

A. P. Grant.

Inventor:

Hugh S. Kerr.

by John A. Wiedersheim

Atty.

N. PETERS, PHOTO-LITHOGRAPHER, WASHINGTON, D. C.

UNITED STATES PATENT OFFICE.

HUGH S. KERR, OF PHILADELPHIA, PENNSYLVANIA.

IMPROVEMENT IN SPONGE BRUSHES.

Specification forming part of Letters Patent No. 126,399, dated May 7, 1872; reissue No. 6,692, dated October 11, 1875; application filed September 9, 1875.

*To all whom it may concern:*

Be it known that I, HUGH S. KERR, of the city and county of Philadelphia, and State of Pennsylvania, have invented a new and useful Improvement in Brushes; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
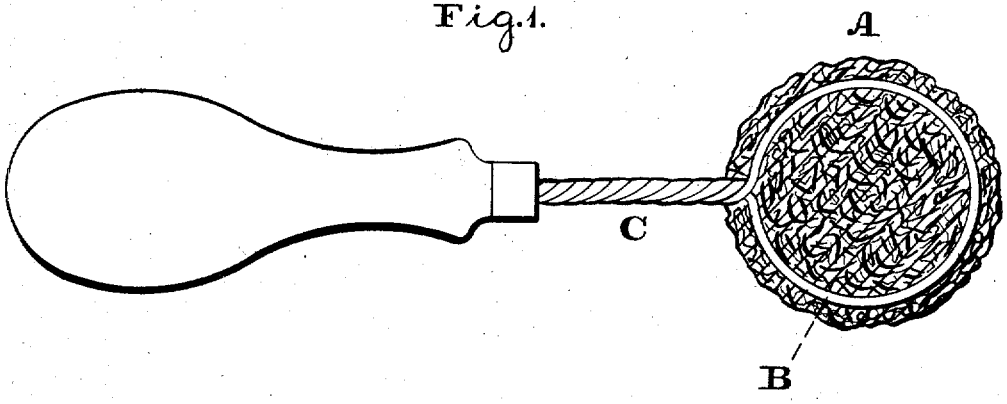
Figure 2:
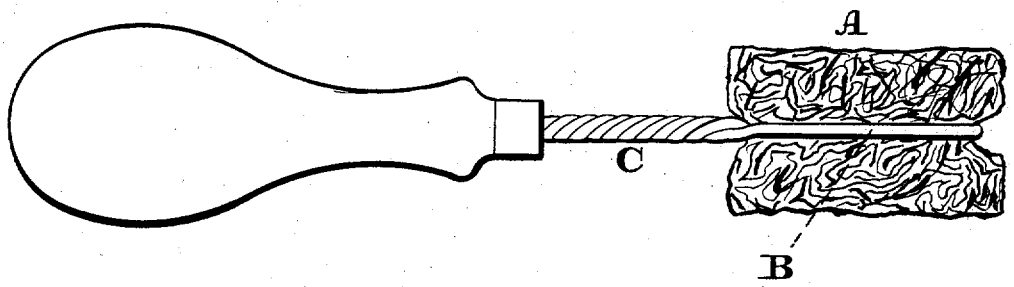

Figure 1 is a face view, partly sectional, of the brush embodying my invention. Fig. 2 is a side view thereof.

Similar letters of reference indicate corresponding parts in the two figures.

My invention consists of a brush constructed of a head of sponge, which is held by a loop of wire, whose ends are twisted so as to form a shank.

Referring to the drawings, A represents a head consisting of a piece of sponge, which is tightly encircled by a loop, B, of wire, whose lengths on each side adjacent to the loop are twisted, so as to form a shank, C.

It will be seen that the sponge presents two working faces. The twist of the wire locks the loop, and the sponge will be firmly held in a simple and inexpensive manner. Moreover, the shank affords means for attachment of a handle, or acting thereas for properly manipulating the sponge head.

Having thus described my invention, what I claim as new, and desire to secure by Letters Patent, is—

The brush consisting of the head A, of sponge, in combination with a loop, B, of wire, encircling the head, and continued into a twisted shank, C, substantially as and for the purpose set forth.

HUGH S. KERR.

Witnesses:
JOHN A. WIEDERSHEIM,
H. E. HINDMARSH.